United States Patent [19]

Ahlstone

[11] 4,124,232

[45] Nov. 7, 1978

[54] RIGID PIPE CONNECTOR WITH LOCK ELEMENTS AND METHOD OF MAKING THE SAME

[75] Inventor: Arthur G. Ahlstone, Ventura, Calif.

[73] Assignee: Vetco, Inc., Ventura, Calif.

[21] Appl. No.: 793,524

[22] Filed: May 4, 1977

[51] Int. Cl.$^2$ ............................................. F16L 35/00
[52] U.S. Cl. .................................... 285/18; 285/381; 285/328; 29/446; 29/525
[58] Field of Search ................. 285/18, 381, 305, 382, 285/382.4, 39, 308, 309, 354, 259, 328, 332, 332.4; 403/15; 29/427, 446, 525, 526, 157 R

[56] References Cited

U.S. PATENT DOCUMENTS

| | | | |
|---|---|---|---|
| 1,344,774 | 6/1920 | Stafford et al. | 285/90 |
| 2,147,343 | 2/1934 | Hokanson | 285/332.4 X |
| 2,671,949 | 3/1954 | Welton | 285/446 |
| 2,934,360 | 4/1960 | Castellanos | 285/18 |
| 3,080,179 | 3/1963 | Huntsinger | 285/333 |
| 3,114,566 | 12/1963 | Coberly et al. | 29/157 R |

Primary Examiner—Werner H. Schroeder
Assistant Examiner—C. J. Arbes
Attorney, Agent, or Firm—Bernard Kriegel

[57] ABSTRACT

A pipe connector has a pin initially stabbed into a box, the pin and box then being axially loaded together at confronting transverse surfaces while the pin and box are pressurized to expand the box and compress the pin, so that when the pressure is relieved a pressure energized shrink fit is provided between the pin and box and the connector is rendered rigid to enhance tensile, compressive and bending strength and provide a fluid tight joint useful in making up lengths of pipe such as piles or pipelines, locking elements or coengageable ratchet teeth or gripping means on the tapered surfaces, automatically locking the pin and box together to prevent separation of the transverse surfaces and hold the pin in compression and the box in tension.

14 Claims, 9 Drawing Figures

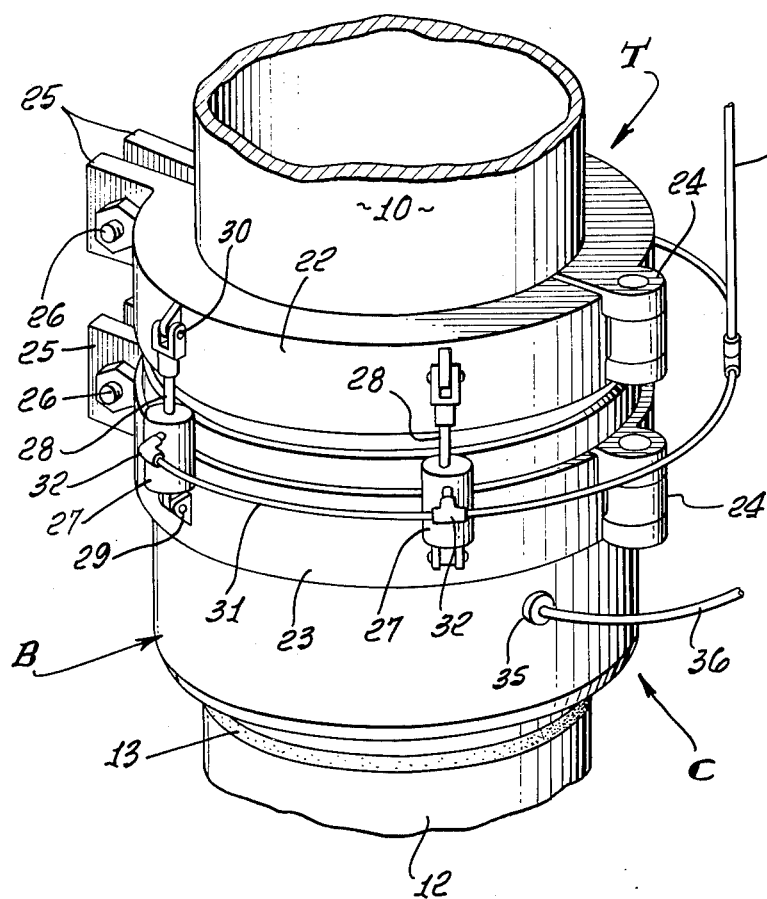
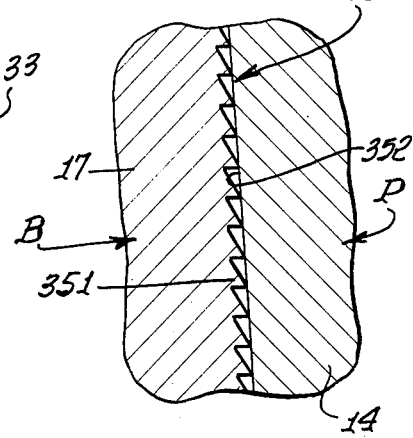
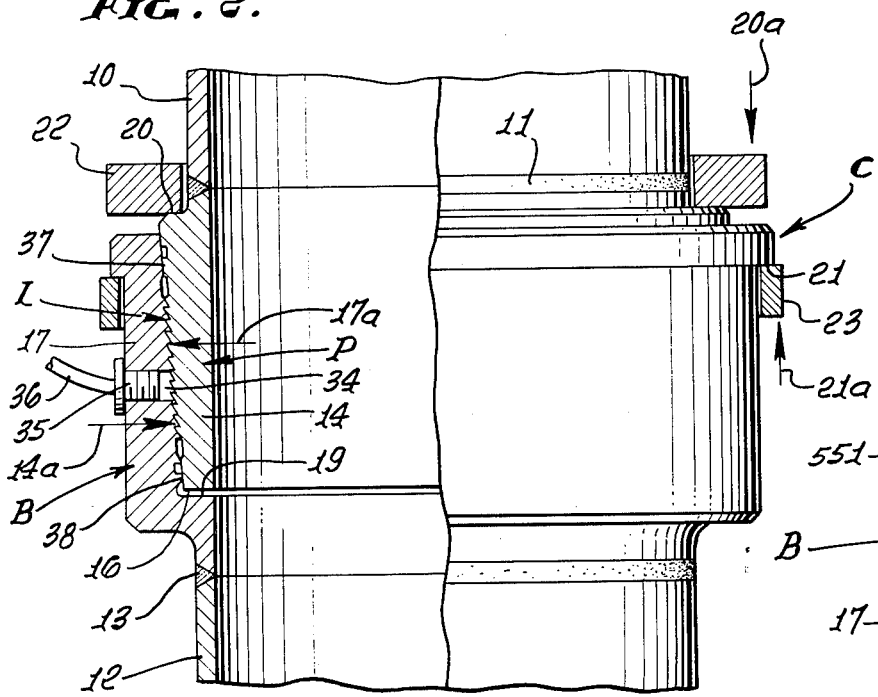
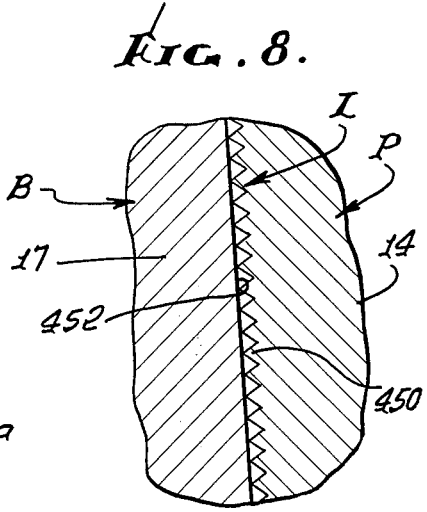
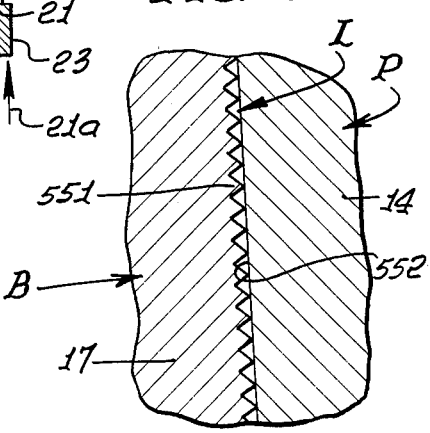

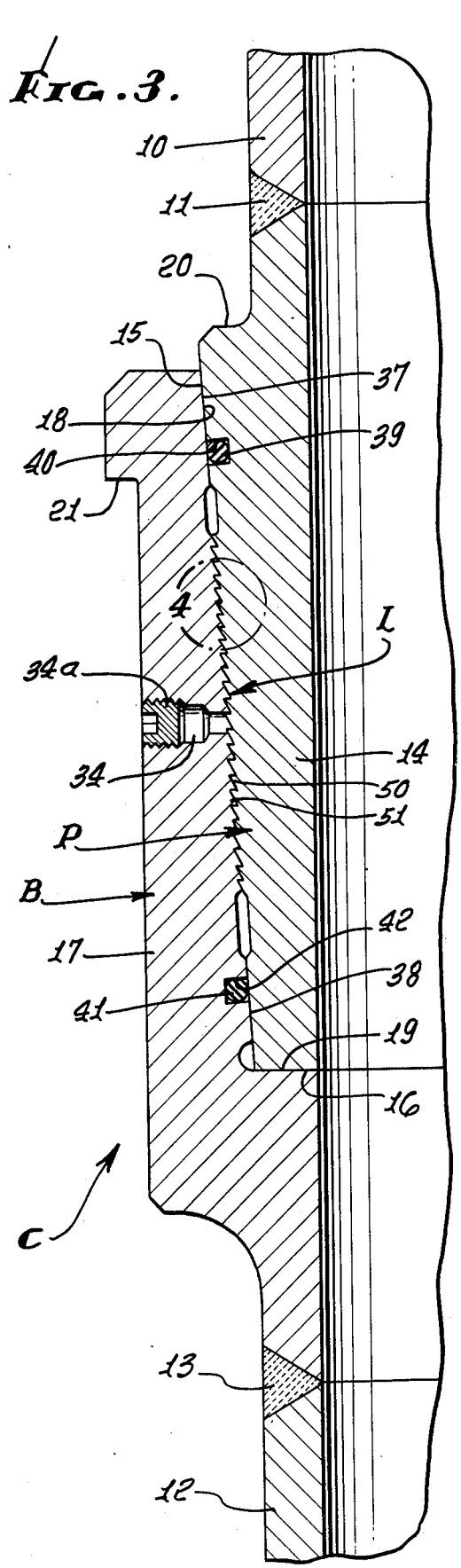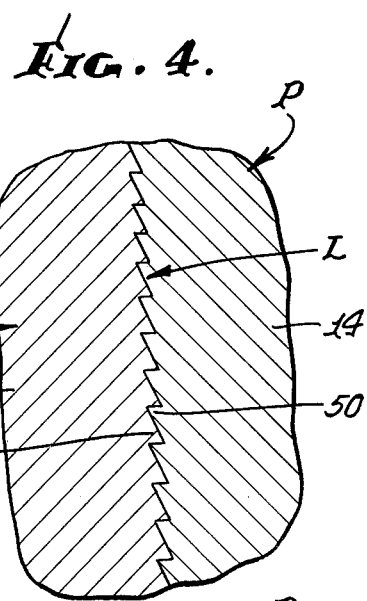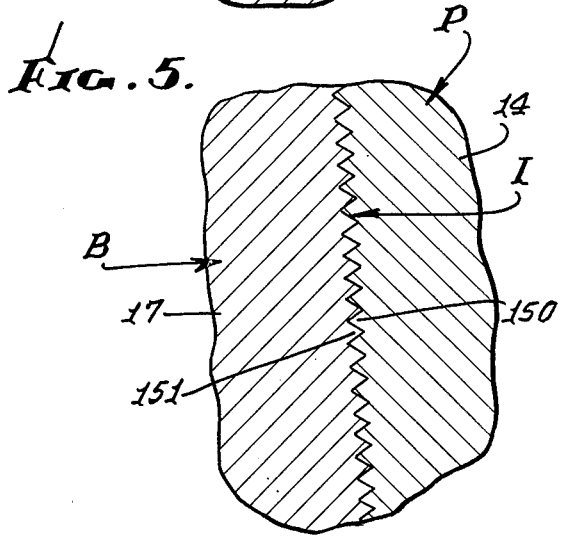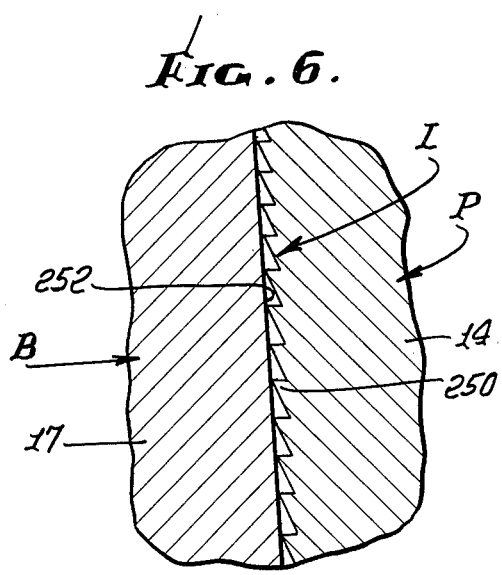

RIGID PIPE CONNECTOR WITH LOCK ELEMENTS AND METHOD OF MAKING THE SAME

Heretofore, it has been known that pipe joints or connections may be made up with an interference fit between the pin and the box, by applying fluid pressure between the opposing threaded portions of the pin and the box while the joint parts are rotated to cause the pin and box to shoulder, thereby avoiding the necessity for heating the joint parts to effect a shrink fit. For example, reference may be had to U.S. Pat. No. 2,671,949, granted Mar. 16, 1954, in the name of R. L. Welton, for "Method of Making Tool Joints".

It is also known that pipe line connectors or pile connectors of relatively large diameter can be improved in terms of strength and resistance to separation due to rebound during pile driving operations, if the pin and box are provided with confronting shoulders which are loaded into axial compressive engagement. For example, reference is made to the pending application for U.S. Pat. Ser. No. 712,491, filed Aug. 9, 1976, in the name of L. E. Reimert, for "Rigid Connector And Piling".

In the pending application of Martin B. Jansen, Jr., Ser. No. 742,072, filed Nov. 5, 1976, there is disclosed a threaded connector for a pipe string, such as a production riser used in connection with sub-aqueous wells, in which the threaded connection between the pin member and the box member of the connector is made up initially through an application of relatively low torque to the members, after which the connector has a straight line pretensioning force of a high tensile value applied to it through use of a suitable tool, the high pretensioned force being retained between the mating threads of the pin and box member by a preload reaction member threaded on the pin member and rotated into solid engagement with the box while the pretensioned force is being applied, to lock the preload into the connector between the threads.

In the laying of pipelines, such as offshore pipelines, the joints of pipe are commonly welded, usually on lay barges having work stations for horizontally lining up lengths of pipe, welding the joints, grinding the joints, and subsequent inspection and coating. Such lay barges are very costly, even when used for laying relatively small pipelines in shallow water, and range upwardly, when used for laying larger pipelines offshore.

At the present time, such lay barges may cost up to $350,000.00 per day. When greater water depths are encountered, horizontal pipeline laying becomes impractical, but vertical pipeline installation from semi-submersible rigs constitutes a practical and relatively economical pipeline installation procedure. Welding of the joints or connections is generally preferred, since most connectors are not rigid or are not locked up and must generally be stabbed at a batter angle while the mating joint parts are controlled during makeup by elaborate devices.

There is, accordingly, a need for connectors for pipeline connections and pile connections which can be made up vertically, or with the pipe at a batter angle, say while supported and handled by equipment such as that present on drilling rigs or semi-submersible drilling rigs, which connectors are durable, safe, easy to make up and have pressure resistance, tensile, compression and bending strength characteristics in excess of such characteristics of the pipe body.

The present invention satisfies the need for such connectors by providing a rigid, stab-type connector or pin and box joint which is pre-loaded together axially to force opposed transverse pin and box surfaces into compressive engagement, while the pin and box are subjected to pressure between their confronting or companion interfitting surfaces, to expand the box and compress the pin radially. When the pressure is relieved, the connector is rigid, has an interference fit and is axially pre-loaded so as to have bearing contact for pile driving which resists axial separation due to rebound effects, and has superior tensile, compression, bending and pressure capability, exceeding that of the pipe joined by the connector. Such joints are, therefore, idealy suited for, but not limited to, use in marine piles and pipelines.

In accomplishing the foregoing, the connector has a box section having an internal transverse surface or shoulder and is adapted to have a pin section inserted therein with the inner transverse end surface of the pin disposed for abutting engagement with the shoulder in the box. Axially spaced companion tapered metal sealing surfaces in the box and on the pin are coengaged, and if desired supplemental ring seals may be provided between the metal-to-metal sealing surfaces. The box has a pressure fitting enabling fluid to be supplied under pressure between the pin and box within the region spanned by the sealing portions to pressure energize the box and pin and effect resilient expansion of the box and contraction of the pin, while a pre-load tool is applied to opposing radial shoulders or tool engaging projections on the box and on the pin. Actuation of the tool enables the connector to be finally or fully made up with a predetermined compressive load on the coengaged box and pin transverse surfaces or shoulders, with the box under tension and the pin under compression, and when the energizing pressure on the box and pin is then released, while the parts are held in the pre-loaded condition by the pre-load tool, the box contracts and the pin expands to provide an interference or shrink fit interlocking the connector parts together in their pre-loaded condition.

As disclosed in my companion application, Ser. No. 726,947, filed May. 4, 1977, for "Rigid Connector for Pipe and Method of making the Same", the box and pin are held in the preloaded condition by an interference fit of the opposed tapered surfaces. According to the present invention, the surfaces are provided with interfacial locking means which automatically act to prevent axial separation of the pin and box or relaxation of the compressive preload, even during rebound when the connector is used in a pile subjected to the blows of a pile driver. The tapered metal-to-metal sealing surfaces prevent leakage from or into the joint and the combination of the axial preload, and the pressure energized fit provides a connector having the advantageous characteristics described above. Such interfacial locking means are more specifically locking elements or fine ribs or threads on the opposing tapered pin and box surfaces or locking elements or fine teeth or serrations on one of the pin and box tapered surfaces engaging the opposing tapered surface to effectively bite into the surface under the influence of the pressure energized interference fit.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention but it is to be understood that such detailed description is not to be taken in a limiting sense.

Referring to the drawings:

FIG. 1 is a perspective illustrating a pipe and a connector during assembly and in a clamping tool for axially loading the connector while it is pressurized;

FIG. 2 is a partial elevation and partial longitudinal section of one form of pipe connector, with the clamping tool broken away, and showing the connector parts stabbed together prior to final make up;

FIG. 3 is an enlarged fragmentary longitudinal section of the pipe connector of FIG. 2;

FIG. 4 is an enlarged fragmentary longitudinal section, showing the locking teeth between the pin and box bracketed by the line 4—4 of FIG. 3;

FIG. 5 is an enlarged fragmentary longitudinal section corresponding to FIG. 4 but showing another form of teeth;

FIG. 6 is an enlarged fragmentary longitudinal section also corresponding to FIG. 4 showing still another form of locking tooth arrangement;

FIG. 7 is an enlarged fragmentary longitudinal section also corresponding to FIG. 4 showing still another form of locking tooth arrangement;

FIG. 8 is an enlarged fragmentary longitudinal section also corresponding to FIG. 4 showing still another form of locking tooth arrangement; and FIG. 9 is an enlarged fragmentary longitudinal section also corresponding to FIG. 4 showing still another form of locking tooth arrangement.

As seen in the drawings, a pipe connector C made in accordance with the invention, comprises an upper pin section P and a lower box section B adapted to interconnect pipe lengths, including an upper pipe section 10, secured by a circumferentially continuous weld 11 to the upper end of the pin P, and a lower pipe section 12, secured by a circumferentially continuous weld 13 to the lower end of the box section B. The connector C is shown and will be described as one wherein the connection is stabbed together by insertion of the downwardly extending pin into the upwardly facing box. It should be understood, however, that in the case of some uses of the connector, this relationship of pin to box may be reversed and the box moved over the pin. Preferably, the inner, upper end of the box B is outwardly flared to facilitate stabbing of the pin into the box, and the tapered form of the parts progressively aligns the parts, as the pin moves into the box. The taper angle is preferably a locking angle.

The pin section P includes a circular body section 14 having an external downwardly tapering surface 15 and a lower end surface 16 which extends transversly of the pin body 14. The box section B comprises a circular body section 17 having an internal downwardly tapered surface 18 complemental to the tapered surface 15 of the pin body, whereby when the pin body is inserted or stabbed into the box, the complemental tapered surfaces 15 and 18 are disposed in confronting coengagement. The box body 17 also includes an inner lower transversly extended shoulder or surface 19 against which the pin surface 16 abuts when the connector is made up. The strength of such joints, as thus far described, in terms of resistance to axial separation or tensile strength, compressive and bending strength, as well as the ability of the connector to withstand fluid pressure, both from within and from without, is dependent upon the extent to which the confronting transverse surfaces 16 and 19 are axially preloaded and the extent to which there is a tight interference fit between the confronting tapered surfaces 15 and 18 of the respective pin and box members.

The present invention provides a joint of superior strength characteristics by reason of the fact that the pin and box sections of the joint or connector are made up in a novel manner. In the vicinity of the upper end of the pin body 14, it is provided with a radially extended, upwardly facing, thrust or pre-load shoulder 20, and adjacent the upper end of the box body 17, it is provided with an external radially outwardly projecting, downwardly facing, thrust shoulder 21. These thrust or pre-load shoulders 20 and 21 are adapted to provide means engageable by a suitable makeup or loading tool T, whereby as indicated by the respective arrows 20a and 21a in FIG. 2, a compressive axial force can be applied to the pin body 14 to load the pin end 16 against the inner box surface 19 while the box body 17 is under tension.

The tool T may be of any suitable form to provide opposing forces as represented by the arrows 20a and 21a, and as illustrated in FIG. 1, such a tool may comprise an upper ring 22 and a lower ring 23, each of the rings 22 and 23 having suitable hinge means 24 hingedly interconnecting ring half parts together so that the ring may be opened for lateral application about the pipe and about the connector. Each ring 22 and 23 also is provided with suitable means, such as outstanding ears 25, at the free ends of the ring half parts, and adapted to receive bolts 26 whereby the rings 22 and 23 may be assembled and secured about the pipe and connector for engagement with the respective thrust shoulders 20 and 21 on the pin and on the box. Means are provided for pulling the rings 22 and 23 axially towards one another, when the rings are disposed about the pipe and connector, so as to apply the opposite forces referred to above. As shown, the pulling means comprises a suitable number of circumferentially spaced hydraulic cylinders 27 having rods 28 projecting therefrom, with the respective cylinders connected to one of the rings as at 29 and the rods connected to the other of the rings as at 30. A hydraulic line 31 is adapted through suitable fittings 32 to supply hydraulic fluid under pressure to the cylinders 27 from a source conduit 33 which is connected to the conduit 31 and to a suitable fluid pressure source (not shown). Thus, when hydraulic fluid is supplied to the cylinders 27 to retract the rods 28 and force the rings 22 and 23 towards one another, the pin and box bodies 14 and 17 can be axially preloaded.

In addition, as mentioned above, the strength of the connector is also dependent upon the interference fit between the opposing tapered pin surface 15 and box surface 18. Accordingly, the box body 17 is provided with at least one radial pressure port 34 threaded to receive a connector fitting 35 for a hydraulic line 36, whereby fluid under pressure can be supplied between the confronting tapered surfaces 15 and 18 of the pin and box between an upper opposed sealing region 37 and a lower opposed sealing region 38 between the tapered pin and box surfaces. The sealing effectiveness of the upper and lower tapered, metal-to-metal sealing regions 37 and 38 may be enhanced by the provision of an upper, annular and resilient sealing ring 39 disposed in a groove 40 in the pin or the box body and a lower, annular and resilient sealing ring 41 disposed in a groove 42 in the pin or the box body, the sealing rings 39 and 41 being sealingly engaged with the opposed tapered surfaces of the respective members.

As seen in FIG. 2, and somewhat exaggerated, when the pin P is stabbed into the box B to the extent that a seal is provided at the upper and lower sealing regions 37 and 38 therebetween, the lower end 16 of the pin P is not fully axially loaded against the confronting box shoulder 19, and as previously indicated, such loading is accomplished in response to the application of the opposing forces by the loading tool T. During the operation of the tool T to axially pre-load the connector, hydraulic fluid under pressure is admitted through the port 34, between the upper and lower sealing regions 37 and 38, sufficient to apply substantial circumferential compressive force to the pin body 14, as indicated by the arrow 14a in FIG. 2, and substantial expansive force, as indicated by the arrow 17a, to the body 17 of the box.

The connector is finally made up while the fluid pressure is maintained, by actuation of the tool T to axially load the confronting pin and box surfaces 16 and 19, while the pin body 14 is under compression and the box body 17 is under tension. Accordingly, when the fluid pressure is relieved there will be effected a pressure energized interference fit between the tapered pin surface 15 and box surface 18, while the confronting transverse surfaces 16 and 19 of the pin and box are in an axially preloaded condition. As a result, the completed joint or connector, as seen in FIG. 3, will have superior strength characteristics in terms of tensile, compressive and bending strength and a fluid tight joint is provided which is useful in making up lengths of pipe such as piles and pipelines.

When the hydraulic line connector 35 has been removed from the pressure port 34, it is preferred that the port 34 be plugged pluged by a suitable screw plug 34a as seen in FIG. 3.

Such a connection of pipe sections 10 and 12 can be easily and quickly made with the usual pipe handling equipment found on drilling barges and the like and with the pipe sections disposed vertically or at batter angles while being initially stabbed together and the making up of the connection can be accomplished more quickly than welded connections have been heretofore made. Thus, the invention not only provides a strong and durable connection which can withstand the severe service of subsea pipelines and piles, but economies are effected in terms of the speed with which the connections can be made up utilizing the very expensive rig or barge equipment.

As previously indicated, the present invention contemplates the provision of locking means L between the pin and box which are energized into locking relation with the pin and box tapered surfaces by the forces derived from the pressure energized interference fit, namely, by the tendency of the pin body section 14 to expand and the tendency of the box body section 17 to contract, when pressure fluid supplied therebetween is relieved.

Referring to FIGS. 3 and 4, the locking means L in this form comprises companion, circumferentially extended ribs or teeth 50 on the tapered pin and ribs or teeth 51 within the tapered box. These ribs or teeth, for ease of manufacture, may be made in the form of a helical thread. The thread form shown is a sawtooth buttress thread, but, as will be later described the thread may be of other formation. In any event, the companion teeth 50 and 51 are exaggerated in FIGS. 3 and 4 so as to be more clearly illustrated, but in reality such teeth should be extremely fine, so as to not interfere with the final make up of the connector by the axial forces applied by the loading tool T, as previously described, but so that the locking teeth or elements are compressively coengaged between the pin and the box when the pressure energized interference fit thereof is effected upon relief of fluid pressure therebetween. When such pressure fluid is relieved and the pin and box relatively expand and contract to effect the interference fit, the locking elements securely interlock the pin and box against axial working and separation of the abutting make up shoulders 16 and 19, whereby the tension applied to the connector, say due to the weight of a long downwardly extending pipe 12, cannot act to reduce the rigidity of the connector or its resistance to bending, and sealing contact at the spaced sealing regions 37 and 38 is maintained.

As previously indicated the form of the locking elements between the pin and the box may be other than as shown in FIGS. 3 and 4, and, accordingly, as seen in FIG. 5 the coengageable locking elements or teeth designated 150 on the pin and 151 in the box are shown as having a V-shaped section. Here again, the locking elements may be formed as a thread to facilitate manufacture, and, again, the V thread should be extremely fine so as not to interfere with the shouldering of the transverse surfaces 16 and 19 during final make up of the connection, but the V-shaped teeth or serrations will coengage and interlock the pin and box against axial separation when the pressure fluid is relieved to enable the pin and box to expand and contract respectively.

While in the embodiments previously described, the locking elements are in the form of companion locking elements on the respective opposing pin and box surfaces, the locking means L may take other forms, whereby to enhance the ability of the pressure energized interference fit to withstand axial separating forces, including such forces as the rebound effect when the connector is employed in connection with a pile to be driven by a pile driver.

As seen in FIG. 6 the locking means L comprises external teeth or serrations formed on the tapered surface of the pin body section 14. The teeth 250 are sawtooth in cross section, and as previously indicated the teeth are very fine and may be formed as a thread to facilitate production, the teeth may be heat treated or hardened so as to enable them to effectively bite into the smooth bore wall 252 defined within the body section 17 of the box. Thus, the serrations or teeth 250 allow the pin to be axially stabbed into the box and the connector can be preloaded by the loading tool T, and when the pressure fluid between the pin and box is relieved to allow the pin to expand and the box to contract, the teeth 250 will effectively be forced to bite into the wall 252 of the box and interlock the parts together.

In FIG. 7, another form of locking element is illustrated, comprising locking teeth or serrations 351 formed within the body 17 of the box and engageable with the smooth external surface 352 on the pin body section 14. Here again, the teeth or serrations 351 are in the form of sawteeth directed downwardly, and such teeth are preferably heat treated or otherwise hardened so that they can effectively bite into the smooth surface 352 of the pin to prevent axial separation of the connector due to the pressure energized interference fit.

As seen in FIG. 8, another tooth form is illustrated at 450 on the pin body section 14 and adapted to bite into the smooth bore wall 452 of the box body section 17 when the connection is made up. In this form, the teeth 450 are triangular in cross-section and are preferably formed as a thread to facilitate manufacture, the teeth being suitably heat treated or hardened to more effectively bite into the surface 452 when the fluid pressure energized connection is completed.

In FIG. 9, a tooth 551 of triangular shape is applied to the inside wall of the box body section 17, the tooth again being preferably in the form of a thread and being hardened to bite into the smooth surface 552 of the pin body section 14.

From the foregoing it will now be understood that the present invention provides a connector for pipe, such as large pipeline pipes or piles, wherein the connector will have greater tensile bending and compressive strength than the body of the pipe of the same material and grade, due to the pin and joint bodies being effectively interlocked together with the pin body in compression against the internal shoulder of the box and with the body of the box in tension as a result of the tool being finally made up by the application of the preload force to the joint parts while the pin is compressed circumferentially by fluid pressure and the box expanded circumferentially, and that the relaxation of the pin and box when fluid pressure is relieved causes the locking elements to coengage or bite into the opposing pin or box surface to securely interlock the pin and box together in the preloaded and pressure energized press fit condition. As indicated above, the interfacial locking of the pin and box together is accomplished by very fine elements which, in reality, may be so fine as to provide essentially a grannular or photographic finish on one or both pressure energized shrink fitted surfaces.

I claim:

1. A rigid pipe connector comprising: a pin and a box; said pin having an externally tapered section and a transverse make up shoulder; said box having an internally tapered body section to receive the tapered section of said pin and having an open end and an inner transverse make up shoulder confronting said pin make up shoulder; said pin section and said box section having therebetween axially spaced companion tapered sealing portions; said box section having port means between said sealing portions for admission therebetween of a pressure fluid acting to circumferentially expand said box section and compress said pin section; and means on said pin and box engageable by a loading tool for axially relatively forcing said sections and compressively loading said make up shoulders while said pressure fluid is acting on said sections; said pin and box sections being held against axial separation with said make up shoulders in compression and said box section in tension by a pressure energized shrink fit between said pin section and said box section upon relief of said pressure fluid; and interfacial locking means between said pin and box sections permitting stabbing of said pin into said box and compressive loading of said makeup shoulders and automatically coacting between said pin and box sections to prevent axial separation thereof in response to the expansive and compressive forces applied to said locking means by the respective pin and box sections.

2. A rigid pipe connector as defined in claim 1; wherein said locking means comprises very fine locking elements disposed between the tapered sections of said pin and box.

3. A rigid pipe connector as defined in claim 1; wherein said locking means comprises very fine complemental teeth on said pin section and in said box section capable of passing during initial insertion of said pin into said box and during compressive loading of said makeup shoulders, said teeth being held coengaged by said shrink fit.

4. A rigid pipe connector as defined in claim 1; wherein said locking means comprises gripping teeth on one of said pin and box sections engageable with an opposing wall of the other of said pin and box sections, said teeth sliding past said wall during initial insertion of said pin into said box and during compressive loading of said makeup shoulders, said teeth biting said wall responsive to said shrink fit.

5. A rigid pipe connector as defined in claim 1; wherein said locking means comprises very fine complemental teeth on said pin section and in said box section capable of passing during initial insertion of said pin into said box and during compressive loading of said makeup shoulders, said teeth being held coengaged by said shrink fit, said teeth being of sawtooth section.

6. A rigid pipe connector as defined in claim 1; wherein said locking means comprises very fine complemental teeth on said pin section and in said box section capable of passing during initial insertion of said pin into said box and during compressive loading of said makeup shoulders, said teeth being held coengaged by said shrink fit, said teeth being of triangular section.

7. A rigid pipe connector as defined in claim 1; wherein said locking means comprises very fine complemental teeth on said pin section and in said box section capable of passing during initial insertion of said pin into said box and during compressive loading of said makeup shoulders, said teeth being held coengaged by said shrink fit, said teeth being in the form of a thread.

8. A rigid pipe connector as defined in claim 1; wherein said locking means comprises gripping teeth on one of said pin and box sections engageable with an opposing wall of the other of said pin and box sections, said teeth sliding past said wall during initial insertion of said pin into said box and during compressive loading of said makeup shoulders, said teeth biting said wall responsive to said shrink fit, said teeth being of sawtooth section.

9. A rigid pipe connector as defined in claim 1; wherein said locking means comprises gripping teeth of one of said pin and box sections engageable with an opposing wall of the other of said pin and box sections, said teeth sliding past said wall during initial insertion of said pin into said box and during compressive loading of said makeup shoulders, said teeth biting said wall responsive to said shrink fit, said teeth being of triangular section.

10. A rigid pipe connector as defined in claim 1; wherein said locking means comprises gripping teeth of one of said pin and box sections engageable with an opposing wall of the other of said pin and box sections, said teeth sliding past said wall during initial insertion of said pin into said box and during compressive loading of said makeup shoulders, said teeth biting said wall responsive to said shrink fit, said teeth being in the form of a thread.

11. The method of making rigid pipe connections comprising: axially coengaging complemental automatic locking portions of tapered pin and tapered box connector parts and disposing opposing axially spaced portions thereof in sealing relation and transversely disposed makeup shoulders thereof in initial confronting relation, compressively loading said makeup shoulders together by applying opposite axial forces to said pin and box placing said pin in compression and said box in tension while circumferentially expanding said box and compressing said pin by the application of fluid pressure therebetween between said sealing portions to allow relative axial movement of said locking portions, and then allowing shrinkage of said box and expansion of said pin by relieving said pressure fluid to effect an interference fit and interlocking said locking portions.

12. The method of claim 11; including providing interlocking teeth between said locking portions.

13. The method of claim 11; including providing teeth on one of said locking portions, and biting said teeth into the other portion.

14. The method of claim 11; including providing hardened teeth on one of said locking portions, and biting said teeth into the other portion.

* * * * *